United States Patent [19]

Lotsch

[11] 4,311,527
[45] Jan. 19, 1982

[54] ISOINDOLINE COLORANTS

[75] Inventor: Wolfgang Lotsch, Beindersheim, Fed. Rep. of Germany

[73] Assignee: BASF Aktiengesellschaft, Rheinland-Pfalz, Fed. Rep. of Germany

[21] Appl. No.: 127,146

[22] Filed: Mar. 4, 1980

[30] Foreign Application Priority Data

Mar. 12, 1979 [DE] Fed. Rep. of Germany ....... 2909644

[51] Int. Cl.³ ............................................. C09D 11/02
[52] U.S. Cl. ................................ 106/22; 106/288 Q; 548/374
[58] Field of Search ................. 548/376, 374; 106/22, 106/288 Q

[56] References Cited

U.S. PATENT DOCUMENTS 3,646,033 2/1972 Leister et al. .................. 260/250 R

FOREIGN PATENT DOCUMENTS 1025080 8/1958 Fed. Rep. of Germany .

*Primary Examiner*—John Kight, III
*Assistant Examiner*—Amelia Yarbrough
*Attorney, Agent, or Firm*—Oblon, Fisher, Spivak, McClelland & Maier

[57] ABSTRACT

Plastics, finishes and printing inks which contain, as the colorant, one or more compounds of the formula

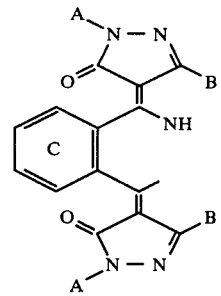

where
A is hydrogen or phenyl and
B is hydrogen, $C_1$-$C_4$-alkyl, phenyl or carbo-$C_1$-$C_4$-alkoxy, the phenyl radicals and the ring C being unsubstituted or substituted by groups which do not confer solubility, and
the four groups A and B may be identical or different from one another.

The colorants have a high tinctorial strength and the colorations have good fastness characteristics and high infrared reflectance.

11 Claims, No Drawings

ISOINDOLINE COLORANTS

The present invention relates to printing inks, finishes and plastics which contain one or more isoindoline colorants as the pigment.

German Pat. No. 1,025,080 describes compounds to which the structure of the formula I is tentatively ascribed. However, the compounds described there are allegedly soluble in organic solvents. On conversion to a water-soluble form, they dye cotton and viscose rayon in blue hues.

We have found that colored plastics, finishes and printing inks having excellent properties are obtained if they contain, as the colorant, one or more compounds of the general formula I

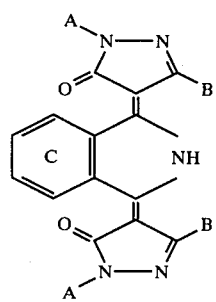

where
A is hydrogen or phenyl and
B is hydrogen, $C_1$–$C_4$-alkyl, phenyl or carbo-$C_1$–$C_4$-alkoxy, the phenyl radicals and the ring C may, independently of one another, not carry further substituents or be substituted by groups which do not confer solubility, and
the four groups A and B may be identical or different from one another.

The colorations obtained are very deep and exhibit very good lightfastness, fastness to weathering and fastness to overcoating. The colorations are black and exhibit very high infrared reflectance.

For the purposes of the invention, groups (substituents) which do not confer solubility are those which do not result in the colorant being soluble in water or in organic solvents. Examples of such substituents are halogen, alkyl or alkoxy each of 1 to 6 carbon atoms, nitro, trifluoromethyl, carbamyl, ureido, sulfamyl and cyano; alkoxycarbonyl, alkanoyl, N-alkylcarbamyl, N-alkylureido or alkanoylamino, each of a total of 2 to 6 carbon atoms; alkylsulfonyl and alkylsulfamyl each of 1 to 6 carbon atoms; aryloxycarbonyl, aroyl, aroylamino, arylsulfonyl, N-arylcarbamyl, N-arylsulfamyl, aryl, N-arylureido and arylazo, and fused 5-membered and 6-membered hetero-rings containing a

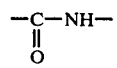

group in the ring.

Preferred substituents which do not confer solubility are chlorine, bromine, carbamyl, sulfamyl, $C_2$–$C_4$-alkanoylamino and benzoylamino.

Amongst the colorants of the formula I, those of the formula II

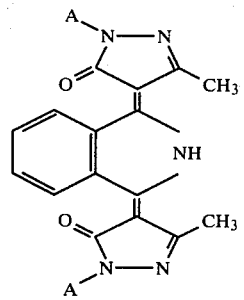

where A has the above meanings are preferred for tinctorial and economic reasons.

The colorants may be used in media, coating agents and film-forming agents employed for coloring, printing or coating of sheet-like structures, such as fabrics, webs and paper.

Examples of media which may be colored are finishes and film-forming solutions of polymer or of polymer-forming compounds, for example cellulose esters, eg. cellulose acetates, propionates and acetobutyrates, polyvinyl chloride, polyethylene, polypropylene, polystyrene, copolymers of styrene, acrylonitrile, butadiene or acrylic acid esters, polyacrylates, nylons, polyesters, alkyd resins, epoxy resins, natural resins and semi-synthetic resins, eg. rosin modified with phenol and formaldehyde.

The preparation of the compounds of the formulae I and II is disclosed in German Pat. No. 1,025,080. According to the latter, (I) and (II) are obtained by reacting the corresponding pyrazolone derivatives with phthalodinitrile in the molar ratio of 2:1. However, the process of the said German Patent gives the colorants I in only moderate yield, and in an impure form, so that the products are unsuitable for use as pigments.

Colorants of the formulae I and II suitable for use as pigments are obtained by condensing one mole of a diiminoisoindoline of the formula III

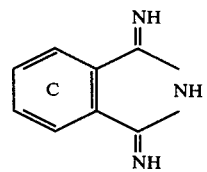

with 2 moles of pyrazolone of the formula IV

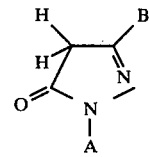

where A, B and C have the above meanings.

Where, in formula I, the two A's or B's, or the A's and B's, are intended to be different, mixtures of pyrazolones of the formula IV can be condensed with the diiminoisoindolines III. However, it is also possible, in accordance with Example 80 of German Laid-Open Application DOS No. 1,670,748, first to condense 1 mole of a pyrazolone IV on one side of the molecule with 1 mole of the diiminoisoindoline III (to give the semi-condensation product) and, in a second stage, to react the semi-condensation product further with another pyrazolone of the formula IV to give the unsymmetrical colorant of the formula I. When carrying out the reaction in one stage, or, in the case of a step-wise reaction, when carrying out the second stage, a slight excess, for example of up to 20%, of pyrazolone can be of advantage.

The condensation of the diiminoisoindolines of the formula III with the pyrazolones of the formula IV can be carried out in water, advantageously in an organic solvent or diluent. The condensation takes place particularly effectively in aliphatic monocarboxylic or dicarboxylic acids, eg. formic acid, acetic acid, propionic acid or mixtures of these, which is why these solvents are preferred. The amount of the solvent used is not critical. The minimum amount is determined by the need to be able to stir the reaction mixture. In general, from 10 to 20 parts by weight of solvent per part by weight of pyrazolone are employed.

The reaction is as a rule carried out at from 50° C. to 150° C., preferably from 70° C. to 120° C.

The products are isolated from the reaction mixture by filtration and can in general be employed directly as pigments. However, it is also possible to convert the products, by conventional conditioning processes, into the optimum pigmentary form for the particular end use.

The Examples which follow illustrate the invention. Parts and percentages are by weight.

EXAMPLE 1

Finish 10 parts of the colorant obtained as described in Preparation Example 1 and 95 parts of a baking finish mixture, which contains 70% of coconut alkyd resin (in the form of a 60% strength solution in xylene) and 30% of melamine resin (in the form of a 55% strength solution in butanol/xylene) are ground in an attrition mill. After applying the finish and baking it for 30 minutes at 120° C., black full-shade coatings having good lightfastness and fastness to overspraying are obtained. If titanium dioxide is introduced into the formulation, grey to black high-hiding colorations are obtained.

If the colorants described in Preparation Examples 2 to 13 are used, coatings in similar black hues and having similar properties are obtained.

EXAMPLE 2

Plastic 0.5 part of the colorant obtained as described in Preparation Example 1 is applied to 100 parts of polystyrene granules (standard grade) by tumbling. The surface-colored granules are homogenized by extrusion at from 190° to 195° C. Black extrudates, whose coloration has good lightfastness, are obtained.

If a mixture of 0.5 part of colorant and 1 part of titanium dioxide is used, high-hiding, greyish black colorations are obtained.

If the colorants obtained as described in Preparation Examples 2 to 13 are used, extrudates in similar hues are obtained.

EXAMPLE 3

Printing ink 8 parts of the colorant obtained as described in Preparation Example 1, 40 parts of a phenol/formaldehyde-modified rosin and from 55 to 65 parts of toluene are thoroughly mixed in a disperser. A black toluene-based gravure printing ink is obtained. The prints obtained with this ink have good lightfastness.

If the colorants of Preparation Examples 2 to 13 are used, printing inks having very similar properties are obtained.

PREPARATION EXAMPLE 1

42 parts of 1-(4-chlorophenyl)-3-methyl-pyrazol-5-one and 20 parts of the monoadduct of ethylene glycol with diiminoisoindoline are stirred, in 500 parts of glacial acetic acid, for 2 hours at room temperature and 3 hours at 90° C. After the mixture has cooled, it is filtered and the product is washed with glacial acetic acid and methanol. 49 parts of the pigment of the formula

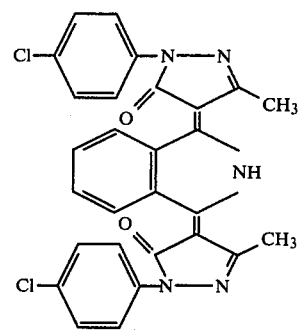

are obtained.

Finishes colored with this pigment exhibit a deep black hue, with very good lightfastness and fastness to overcoating, and a high infrared reflectance.

PREPARATION EXAMPLES 2 TO 11

Black pigments with similar properties are obtained if the pyrazolones listed, of the formula IV, are condensed with diiminoisoindoline by the method described in Example 1.

The substituents A and B of the products obtained (formula I) are shown in the Table.

| Example | Pyrazolone of the formula IV | Colorant of the formula I, where |
|---|---|---|
| 2 | H, H, CH$_3$, O, N, N, H | A = H<br>B = —CH$_3$ |
| 3 | H, H, CH$_3$, O, N, N, phenyl | A = —phenyl<br>B = —CH$_3$ |
| 4 | H, H, CH$_3$, O, N, N, (3-Cl-phenyl) | A = —(3-Cl-phenyl)<br>B = —CH$_3$ |

| Example | Pyrazolone of the formula IV | Colorant of the formula I, where |
|---|---|---|
| 5 | (structure) | A = —C6H4—CH3<br>B = —CH3 |
| 6 | (structure) | A = —C6H4—SO2NH2<br>B = —CH3 |
| 7 | (structure) | A = —C6H4—NHCOCH3<br>B = —CH3 |
| 8 | (structure) | A = —C6H3Cl2 (2,5-dichloro)<br>B = —CH3 |
| 9 | (structure) | A = —C6H4—NHCOCH3<br>B = —CH3 |
| 10 | (structure) | A = —C6H4—NO2<br>B = —CH3 |
| 11 | (structure) | A = —C6H5<br>B = —C6H5 |

PREPARATION EXAMPLE 12

42 parts of 1-(4-chlorophenyl)-3-methyl-pyrazole-5-one and 20 parts of the monoadduct of ethylene glycol with diiminoisoindoline are stirred, in 500 parts of glacial acetic acid, for 2 hours at room temperature and 3½ hours at 70° C. After the mixture has cooled, it is filtered and the product is washed with glacial acetic acid and methanol. 49 parts of the pigment of the formula

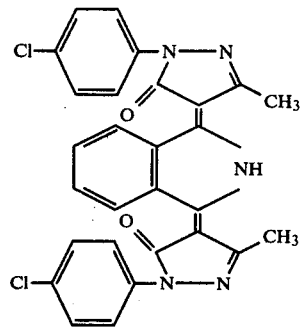

are obtained.

Finishes colored with this pigment exhibit a deep greenish black hue, with very good lightfastness and fastness to overcoating, and a high infrared reflectance.

PREPARATION EXAMPLE 13

42 parts of 1-(4-chlorophenyl)-3-methyl-pyrazol-5-one and 20 parts of the monoadduct of ethylene glycol with diiminoisoindoline are stirred, in 400 parts of isobutanol and 20 parts of glacial acetic acid, for 1 hour at room temperature and 3 hours at 80° C. After the mixture has cooled, it is filtered and the product is washed with glacial acetic acid and methanol. 49 parts of the pigment of the formula

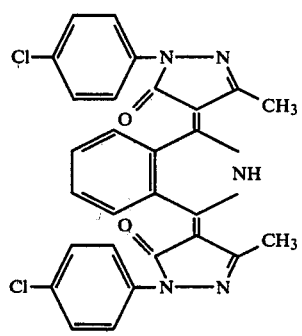

are obtained.

Finishes colored with this pigment exhibit a deep greenish black hue, with very good lightfastness and fastness to overcoating, and a high infrared reflectance.

I claim:

1. In a colored polymer or coating composition, the improvement which comprises using a coloring amount of a colorant therefor which is a compound of the formula I:

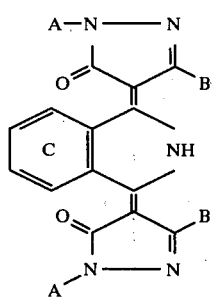

where A is hydrogen or phenyl, and

B is hydrogen, $C_1$-$C_4$ alkyl, phenyl or carbo-$C_1$-$C_4$-alkoxy, the phenyl radicals and the ring C being unsubstituted or substituted by groups which do not confer solubility, and the four groups A and B may be identical or different from one another;

wherein said compound is prepared by condensing one mole of a diiminoisoindoline of the formula II:

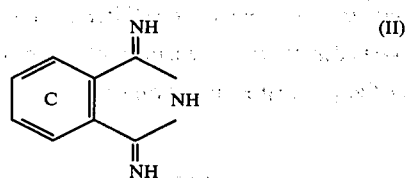

with two same or different moles of a pyrazolone of the formula III:

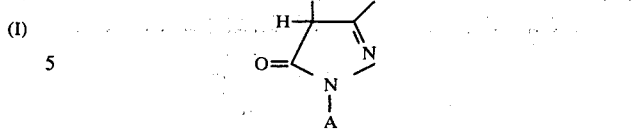

2. In the colored polymer or coating composition of claim 1, wherein the ring C and the phenyl radicals A and B are unsubstituted or are substituted, independently of one another, by chlorine, bromine, carbamyl, sulfamyl, $C_2$-$C_4$ alkanoylamino or benzoylamino.

3. In the colored polymer or coating composition of claim 1, wherein the ring C does not carry further substituents and the phenyl radicals in A and B are unsubstituted or are substituted, independent of one another, by bromine, carbamyl, sulfamyl, or $C_2$-$C_4$ alkanoylamino.

4. In the colored polymer or coating composition of claims 1, 2 or 3, wherewin B is methyl.

5. In the colored polymer of coating composition of claim 4, wherein A is 3-chlorophenyl, 4-chlorophenyl, phenyl or hydrogen.

6. In the colored polymer or coating composition of claim 1, wherein said reaction between said diiminoisoindoline II and said pyrazolone III is carried out in one stage.

7. In the colored polymer or coating composition of claim 1, wherein said two moles of pyrazolone III are different.

8. In the colored polymer or coating composition of claims 1 or 7, wherein said reaction between said dye diiminoisoindoline II and said pyrazolone III is carried out in two stages.

9. In the colored polymer or coating composition of claim 8, wherein an excess of pyrazolone III is used in the second stage.

10. In the colored polymer or coating composition of claim 1, wherein said reaction is carried out in an aliphatic monocarboxylic or dicarboxylic acid as a solvent.

11. In the colored polymer or coating composition of claim 1, wherein said reaction is carried out at 50°-150° C.

* * * * *